United States Patent [19]

Albersmann

[11] Patent Number: 5,000,974
[45] Date of Patent: Mar. 19, 1991

[54] PROCESS OF THE PREPARATION OF FRUIT, VEGETABLE OR SPICY AERATED FOODS

[75] Inventor: Heinz Albersmann, Emmerich, Fed. Rep. of Germany

[73] Assignee: International Flavors & Fragrances, Inc., New York, N.Y.

[21] Appl. No.: 359,774

[22] Filed: May 31, 1989

Related U.S. Application Data

[63] Continuation-in-part of Ser. No. 117,260, Nov. 6, 1987.

[30] Foreign Application Priority Data

Nov. 12, 1986 [DE] Fed. Rep. of Germany ....... 3638622

[51] Int. Cl.$^5$ .................... A23L 1/05; A23G 9/04
[52] U.S. Cl. .................... 426/564; 426/565; 426/566; 426/567; 426/569; 426/572; 426/599
[58] Field of Search .............. 426/564, 565, 566, 569, 426/572, 599

[56] References Cited

U.S. PATENT DOCUMENTS

| | | | |
|---|---|---|---|
| 2,588,308 | 3/1952 | Tressler | 426/564 |
| 2,808,336 | 10/1957 | Kalish | 426/564 |
| 2,808,337 | 10/1957 | Gibsen | 426/564 |
| 2,913,341 | 11/1959 | Steigmann | 426/564 |
| 2,913,342 | 11/1959 | Cameron | 426/570 |
| 3,098,748 | 7/1963 | Noznick et al. | 426/570 |
| 3,119,699 | 1/1964 | Gunther | 426/564 |
| 3,119,701 | 1/1964 | Gunther | 426/564 |
| 3,365,305 | 1/1968 | Hunter | 426/564 |
| 3,800,036 | 3/1974 | Gabby et al. | 426/564 |
| 3,809,764 | 5/1974 | Gabby et al. | 426/564 |
| 3,846,570 | 11/1974 | Vetter et al. | 426/ |
| 4,021,583 | 5/1977 | Arden | 426/134 |
| 4,081,566 | 3/1978 | Haber | 426/564 |
| 4,081,567 | 3/1978 | Haber | 426/564 |
| 4,242,367 | 12/1980 | Igoe | 426/565 |
| 4,244,981 | 1/1981 | Blake et al. | 426/564 |
| 4,293,580 | 10/1981 | Rubenstein | 426/569 |
| 4,368,211 | 1/1983 | Blake et al. | 426/564 |
| 4,525,372 | 6/1985 | Giddey et al. | 426/564 |
| 4,609,561 | 9/1986 | Wade et al. | 426/564 |
| 4,828,866 | 5/1989 | Wade et al. | 426/564 |

*Primary Examiner*—Jeanette Hunter
*Attorney, Agent, or Firm*—Beveridge, DeGrandi & Weilacher

[57] ABSTRACT

Low-calorie aerated fruit, vegetable and spicy foods free of fats and albumin having improved taste, increased volume and stable structure said foods containing sugar or sugar substitutes or sweeteners, spices or fruit or vegetable extracts combined with hydrocolloids and optionally suitable emulsifiers to achieve a high and stable overrun.

29 Claims, No Drawings

PROCESS OF THE PREPARATION OF FRUIT, VEGETABLE OR SPICY AERATED FOODS

REFERENCE TO RELATED APPLICATION

This is a Continuation-In-Part of my application Serial No. 117,260 filed Nov. 6, 1987.

BACKGROUND OF THE INVENTION

The present invention relates to a process for making aerated fruit, vegetable or spicy foods. More particularly, the present invention provides an aerated or whipped food product that finds many useful applications including use as a dessert or for enriching, garnishing or filling ready-to-eat foods, such as desserts, sherbet, yogurt, baked goods, after meal snacks, and the like.

By the aeration of such foods with air or gases such as nitrogen, a more agreeable and a pleasant feel is achieved by means of a light, frothy consistency, and wherein also the fruit aromas become concentrated in the air bubbles resulting in more pronounced organoleptic effect, the volume is increased and the weight of the food is proportionally reduced, so that a lower-calorie effect is achieved.

In West German Laid-Open Application No. 2,147,033, low calorie garnishes, spreads and frozen desserts have been considered as imitations of oily, fat-containing spreads such as butter, margarine, cheese or dips, frozen desserts, including ice cream and sorbet as well as puddings, glazes, sauces and the like. Foodstuffs of this type are not of high nutritional value, but serve to satisfy the pleasure of eating in unlimited quantities, when such is desired or dietetically necessary. According to the patent, they represent aqueous aerated products of composition up to 55 weight percent of nonaqueous constituents, such as fructose, a maximum of 5% of fat, 0.33 to 7.5 weight percent of a special polyglycerol fatty ester and 0.2 to 3 weight percent of hydrophilic colloids and are predominantly oily imitations.

The formulations therein which provide the materials for making oily imitations of foods at home or for making low calorie cakes, must be processed in one and even in two stages at high temperatures, which are to be maintained within narrow tolerances. It has been found that, in the use of polyglycerol fatty esters, structure stability of relatively long duration can not be achieved, but instead a negative influence is exerted, leading to saponification of the emulsifier and thus resulting in complete loss of the aeration property in addition to also having a strongly negative organoleptic influence on the product. The prior art does not suggest producing aerated food preparations having the properties of aerated foods according to the objective of the present invention.

In U.S. Pat. No. 3,556,810 which discloses making edible dessert gel, a suitable gelling agent is proposed for increasing the strength and the consistency as well as for preventing syneresis, but there is no indication or teaching directed to producing aerated fruit foods, which is the object of the present invention.

The aeration of foods has been employed for obtaining one or more of the above properties frequently for whipped creams, albumin-sugar aerated foods, which are often referred to as meringues, sherbet, puddings and similarly prepared mixed foods, to which natural fruit flavorings or substances identical in nature thereto have been added in some cases.

However, to achieve the desired taste quality and degree of aeration as well as relatively stable structure, it has heretofore been necessary in this connection to use high percentage contents of albumin, sugar and fats as illustrated by whipped cream and cream-filled chocolate cakes. These sweet foods or desserts presented as after-meals or between-meals snacks represent very rich foods. The high amount of calories of these foods is undesirable, but are tolerated because of lack of awareness of less-rich desserts having the desired properties, insofar as such desserts are considered to enhance and complete a meal.

A further disadvantage is that such foods, because of their fat-sugar-albumin or fat-sugar contents, are difficult to digest, since they often cause fermentation processes during metabolism.

Moreover, milk products such as curd, yogurt or the like are to an increasing degree being aerated and sold in cups with fruit products such as fruit bases added to improve the taste as well as to increase their appeal. However, these fruit products lack the special advantages of aeration, in particular, the increase in volume, and in order for these fruit constituents to meet the desired purpose, relatively large amounts thereof must be added, which increases the cost.

Finally, such aerated milk products with appropriate fruit proportions are also processed to homogeneous mixtures and also sold in cups, but the same stated disadvantages exist.

DESCRIPTION OF THE INVENTION

The object of the invention is the preparation aerated, structure-stable and temperature-insensitive as well as inexpensive food products with a fruit, vegetable or spicy basis, i.e., using not only fruit produce or fruit bases or fruit extracts or fruit concentrates, but also common vegetable additives such as paprika, horseradish, mustard, pickled cucumber and the like, as well as conventional flavorings such as, for example, vanilla, chocolate, caramel, coffee or similar, which contain no notable albumin and fat constituents. The food products are also made for diabetic use without sugar, which is replaced with sugar substitutes, without incurring the disadvantages and limitations of the foods known heretofore. It is necessary that the fruit base used for aeration be available as the ready-made one-component substance, which suffers no quality loss as regards the making of aerated foods regardless of the storage period in this ready-for-delivery condition.

The aerated foods according to the invention are made in a low-calorie form which is easy to digest, pleasant to eat and inexpensive. The desired volume increase is of approximately 70 to over 150%, preferably to about 95 to 105%, and the foods are so stable structurally and temperature-resistant for long periods that they can be used for combining, enriching and garnishing other foods or for incorporation therein, such as in sweet foods, desserts, milk products, also with relation to their incubation, baked goods and also as individual foods. These new aerated foods are also intended to be particularly suitable for inclusion in containers such as cups, bottles, goblets, preferably in layers with other foods or alone, as well as in dispensing tubes for known decoration purposes.

The modern trade practice for the sale of ready-made food products require these characteristics to ensure high stability in transport, heat and cold stability as well as long storage capability be guaranteed and that a stimulating presentation and appealing packaging be provided. Thus such aerated foods must be largely immobilized in the aqueous phase, in order to prevent dissolution in the other components of the combined ready-made foods, whereby defined specific weight must be achievable, in order that they can float on or in other foods, such as yogurt or other creams, when introduced into transparent cups, or remain fixed as highly conspicuous interlayers and not sag or rise undesirably.

This objective is achieved by a process wherein, to achieve an overrun of 70 to 150% calculated on the base of approximately 10 to 70% dry mass, at a whipping temperature of approximately 7° to 9° C., a fruit base or fruit components of the following formulation are used:

either in sweet sugar-based aerated foods, approximately 20 to 70% of fruit, preferably 30 to 70% of fruit, approximately 20 to 60% of sugar, or in sugar-substitute-based sweet aerated foods, approximately 20 to 70% of fruit, preferably 30 to 70% of fruit, synthetic sweeteners according to taste, or in seasoned aerated vegetable foods, 30 to 50% of fruit, salt and/or sugar in small quantities according to taste, or in fruit concentrate-based aerated foods, quantities of the fruit extracts according to contents and taste, in which foods the following are to be mixed in during the processing of the aeratable fruit base:

(a) 0.5 to 0.8 weight percent, relative to the base, of a hydrocolloid combination of approximately the following composition:
 about 25% of locust-bean flour,
 about 25% of pectin, degree of esterification approximately 35 to 38%,
 about 50% of carrageenans, (b) emulsifier in a quantity of approximately 0.03 to 0.08 weight percent, or as much as up to 0.8 weight percent or in a range of 0.3 to 0.6 weight percent, relative to the base of mono- and diglycerides, for example:
 either distilled monoglyceride and stearoyl-2-lactylates or distilled monoglyceride and diacetylated tartaric acid monoglyceride ester or diacetylated tartaric acid monoglyceride ester and sodium stearate, and
 the rest water.

In another embodiment of the invention, about 20% to less than 30% of fruit is employed.

It is a further feature of the invention that when an overrun of only 50 to 70% relative to the base is to be achieved and an embodiment of the produced aerated food with high content of fine pores is not desired, no emulsifier is used.

In accordance with the knowledge of those skilled in the art, it lies within the scope of the invention to select known additives, and also, in order to achieve the required or desired mechanical properties of the aerated fruit foods, to adjust the components of the aerating apparatus accordingly with regard to the pressures, the rpm of the blender head and the air feed.

To achieve a particularly high stiffness and consistency of the aerated food, so that the existence of firmness can be considered, it is proposed to increase the proportion of the hydrocolloids to approximately 0.6 to 1.0% and that of the emulsifier to approximately 0.08 to 0.1 weight percent.

The described process of aeration of the indicated formulations permits a plurality of new, optional combinations with other creamy, solid or frozen foodstuff preparations, without involving intermixing or dissolution. The distinct separation of the components remains stably preserved. The aerated product can remain in liquid suspension, that is, float on water or be immersed therein.

It is particularly advantageous that by the process of the invention, it is also possible to achieve the aeration of products for the further cooking-related use of prepared foodstuffs of plant origin, such as creamy, aerated stable preparations containing horseradish, mustard, tomatoes or other vegetables as well as spices with stabilizers, without or with the use of a little sugar, but with salt and, if desired, vinegar or other edible acids.

The process of the invention is also applicable for making dietary products, e.g., for diabetics, if the sugar is replaced by fructose or sugar substitutes, e.g., sorbitol, xylitol, etc., as necessary in combination with synthetic sweeteners.

The particular advantages of the invention reside especially in the fact that the fruit base considered for aeration can contain all the constituents of the formulation and thereby is storable for as long as desired. This is very favorable for simple and risk-free making of aerated foods, specially by means of the emulsifier defined according to the invention to be appropriate for the purpose. Specifically, it has been found that the bases prepared for aeration, in which other known emulsifiers were used, can indeed be aerated in the fresh condition, but after a relatively short storage period the emulsifier hydrolyzes in the medium and thereby organoleptically imparts a soapy character to the product. Moreover, after a very short storage period, the base to which the inappropriate emulsifiers have been added can no longer be aerated, since these saponified emulsifiers adversely influence the otherwise aeratable properties of the used hydrocolloids.

It is also advantageous that the aerated fruit, vegetable or spicy aerated preparations, as a type of emulsion provide either sugared foods, i.e., with or without any significant proportions of fat and albumin, and thus are low-calorie and easily digestible while having favorable sweet taste and taste appeal, or that seasoned aerated vegetable or spicy foods are also available without any or only low fat and albumin proportions.

Heretofore unknown but particularly advantageous is the fact that the aerated foods of the invention have, at a high overrun of approximately 70 to 150%, and in special cases even up to approximately 200%, a relatively high and stable consistency with good temperature resistance in ranges of application between approximately −30° and +45° C. The impression is that of a particularly favorable offering because of the large volume-to-weight ratio which is enhanced by the fact that these structurally stable aerated foods can be used preferably in transparent containers and for garnishing or filling other foods, and are also advantageously suitable for direct consumption.

An additional advantage specific to the type of aerated food according to the invention is present in the consumption of these foods when they are in the frozen or even deep-frozen condition, and are particularly pleasing when thawed since the thawing process is found to be particularly agreeable, without the observation of ice crystals, i.e., a non-gritty condition, since no notable ice crystals whatsoever are formed in the process of the invention.

It has been found that the taste and the pleasant feel during consumption is most favorable with overrun of approximately 95 to 105%, although higher overruns, e.g., 150 to approximately 200%, can be used for special occasions when desired, for example, for festivities of a particular kind, such as children's parties, church functions and the like.

By means of the following formula, the percentage of aerated fruit or overrun is calculated as follows:

$$\text{percentage overrun} = \frac{G_1 - G_2}{G_2} \times 100$$

wherein:
$G_1$ = weight of the starting fruit before aeration,
$G_2$ = weight of the aerated fruit base.

In the homogeneous aeration process, very fine air bubbles are worked into the aerated food, in which process the desired $a_W$ values can be adjusted by means of the dry substance, e.g., by the use of sugar.

In connection with the immobilizing aqueous phase by the use of natural stabilizers that is, hydrocolloids, the stability of the aerated product is ensured. The satisfactory bacteriological condition is also ensured by sufficiently high temperatures during the preparation of the bases to be aerated.

The following examples illustrate formulations of the invention.

All weight percents given without reference are relative to the base of the dry mass.

EXAMPLE 1

For aeration of a sugar-sweetened fruit food, the aerating machine is adjusted relative to the feed of the stabilized, pasteurized fruit-base system, the gas feed, the pressure and the backpressure thereof as well as the rotational speed of the mixing heads to obtain approximately 100% overrun calculated on the starting quantity of the base, at a temperature of the ingredients of approximately 7 to 9° C. with the following formulation of the fruit base:
approximately 30% of fruit,
approximately 45 to 50% of sugar,
approximately 0.5 to 0.9 weight percent of hydrocolloids of the following consumption:
25% of locust-bean flour,
25% of pectin with degree of esterification of approximately 35 to 38%,
50% of carrageenans,
0.03 to 0.08 weight percent of emulsifier,
the remainder water.

EXAMPLE 2

Sufficient formulation for an overrun of approximately 70% of an aerated sugar-sweetened fruit food:
approximately 30% of fruit,
approximately 45 to 50% of sugar,
hydrocolloids as in Example 1,
the remainder water.

EXAMPLE 3

Preparation of a low-calorie aerated food, sugar-sweetened, with approximately 100% overrun, with the following formulation:
approximately 30% of fruit,
approximately 20 to 25% of sugar,
approximately 0.5 to 0.9 weight percent of hydrocolloids of the following composition:
25% of locust-bean flour,
25% of pectin with degree of esterification of approximately 35 to 38%,
50% of carrageenans,
0.03 to 0.08 weight percent of emulsifier,
the remainder water.

EXAMPLE 4

Preparation of dietary formulation for an overrun of approximately 100%:
approximately 30% of fruit,
approximately 10 to 20% of fructose,
synthetic sweeteners according to taste,
0.7 to 1.0% of hydrocolloids of approximately the following composition:
25% of locust-bean flour,
25% of pectin,
50% of carrageenans,
03 to 0.08 weight percent of emulsifier,
the remainder water.

EXAMPLE 5

Preparation of an aerated food of vegetable-flavor according to the following formulation, with an overrun of approximately 100%:
approximately 30 to 50% of fruit (vegetables),
salt and/or sugar according to taste,
approximately 0.7 to 1.0 weight percent of hydrocolloids of the same composition as in Example 1,
0.03 to 0.08 weight percent of emulsifier,
the remainder water.

EXAMPLE 6

Preparation of an aerated food using plant extracts such as vanilla, chocolate, coffee and the like, with an approximately 100% overrun, with the formulation:
fruit extracts in quantities according to taste and contents,
approximately 20 to 50% of sugar,
approximately 0.5 to 1.0 weight percent of hydrocolloids of the same composition as in Example 1,
0.03 to 0.08 weight percent of emulsifier,
the remainder water.

EXAMPLE 7

Formulation of a fruit base for preparation of an aerated food product:
approximately 40 weight percent of fruit,
approximately 30 weight percent of sugar,
0 5 to 0.9 weight percent of hydrocolloids of the same composition as in Example 1,
the remainder water.

EXAMPLE 8

The formulation according to Example 7, except that 25 weight percent of sugar is added.

EXAMPLE 9

Formulation for an aerated, sugar sweetened fruit food product:
approximately 19.5 weight percent of fruit,
approximately 28.0 weight percent of sugar,
approximately 0.5 to 0.9 weight percent of hydrocolloids having the composition as in Example 1,
the remainder water.

EXAMPLE 10

Formulation for an aerated fruit product:
approximately 20 weight percent of fruit,
approximately 18 weight percent of fructose,
approximately 0.5 to 0.9 weight percent of hydrocolloids having the composition as in Example 1,
the remainder water.

EXAMPLE 11

Formulation for preparation of an aerated fruit product:
approximately 55 weight percent fruit,
approximately 15.4 weight percent fructose,
approximately 0.5 to 0.9 weight percent of hydrocolloids of the same composition as in Example 1,
the remainder water.

EXAMPLE 12

The formulations as in Example 11, except that 70 weight percent of fruit and 14 weight percent of fructose are present.

EXAMPLE 13

Formulation for preparation of an aerated fruit product:
approximately 56 weight percent of fruit;
approximately 30 weight percent of sugar;
approximately 0.5 to 0.8 weight percent of hydrocolloids of the same composition as in Example 1,
the remainder water.

EXAMPLE 14

The formulation as in Example 13, except that 49 weight percent of fruit and 32 weight percent of sugar are present.

EXAMPLE 15

The formulation as in Example 14, except that 12.6 weight percent aspartame is added in lieu of the sugar.

EXAMPLE 16

The formulation as in Example 13, except that 33 weight percent of fruit and 22 weight percent of sugar are present.

EXAMPLE 17

Preparation of an aerated food of fruit flavor having the formulation according to Example 1, except that 0.3 to 0.6 weight percent of emulsifier is added.

EXAMPLE 18

Preparation of low-calorie aerated food of fruit flavor having the formulation according to Example 3, except that 0.3 to 0.6 weight per cent of emulsifier is added.

I claim:

1. A process for making aerated fruit, vegetable or spicy foods in the absence of fat and albumin, and having an overrun of about 70 to 150%, at a temperature of 7° to 9° C., comprising providing a fruit, vegetable or spicy food base, conveying said food base to cooling aerating means, regulating the gas flow rate and pressure introduced in said cooling aerating means and aerating and cooling the food base to thereby obtain a degree of aeration of about 70 to 150% and a temperature of the ingredients of 7° to 9° C., wherein said fruit, vegetable or spicy food is a ready-made one-component base selected from the following formulations, relative to the dry mass:

(1) approximately 20 to 70% of fruit, approximately 20 to 60% of sugar, or
(2) approximately 20 to 70% of fruit, approximately 10 to 20% fructose, and effective amounts of synthetic sweetners, or
(3) approximately 20 to 70% of fruit, and effective amounts of synthetic sweeteners, or
(4) approximately 20 to 50% of fruit, and effective amounts of salt and/or sugar, or
(5) quantities of vegetable or fruit plant extracts, having added thereto
0.5 to 0.8 weight percent, relative to the base, of a hydrocolloid combination of the following composition:
about 25% of locust-bean flour,
about 25% of pectin, degree of esterification 35 to 38%,
about 50% of carrageenans, and
0 to 0.08 weight percent, relative to the base, of an emulsifier selected from the following combinations:
(a) distilled monoglyceride and stearoyl-2-lactylate,
(b) distilled monoglyceride and diacetylated tartaric acid monoglyceride ester, or
(c) distilled tartaric acid monoglyceride ester and sodium stearate;
and the remainder water.

2. A process according to claim 1 for making aerated fruit, vegetable or spicy foods in the absence of fat and albumin, having an overrun of about 70 to 150%, at a temperature of 7° to 9° C., wherein the fruit, vegetable or spicy food base is a ready-made one-component base selected from the following formulation, relative to the dry mass:

(1) approximately 30 to 70% of fruit, approximately 20 to 60% of sugar, or
(2) approximately 30 to 70% of fruit, approximately 10 to 20% of fructose, and effective amounts of synthetic sweeteners, or
(3) approximately 30 to 70% of fruit, and effective amounts of synthetic sweeteners, or
(4) approximately 30 to 50% of fruit, and effective amounts of salt and/or sugar, or
(5) quantities of vegetable and/or fruit plant extracts, having added thereto;
0.5 to 0.8 weight percent, relative to the base, of a hydrocolloid combination of the following composition:
about 25% of locust-bean flour,
about 25% of pectin, degree of esterification 35 to 38%,
about 50% of carrageenan, and
0 to 0.08 weight percent, relative to the base, of an emulsifier selected from the following combinations:
(a) distilled monoglyceride and stearoyl-2-lactylate, or
(b) distilled monoglyceride and diacetylated tartaric acid monoglyceride ester, or
(c) diacetylated tartaric acid monoglyceride ester and sodium stearate;
and the remainder water.

3. The process according to claim 2, wherein, to achieve a high stiffness of the aerated foods, the proportion of the hydrocolloid content is adjusted to approximately 0.8 to 1.0 weight percent, relative to the food bases.

4. The process according to claim 2, wherein no emulsifier is added.

5. The process according to claim 3, wherein no emulsifier is added.

6. The process according to claim 1, wherein aeration is conducted with regulating the gas flow rate and pressure by means of an aerating machine, preferably with adjustable rotational speed of the mixing head and adjustable continuous feed of the individual ingredients, such as fruit base with additives, sugar or substitutes therefor or vegetable-extract or fruit-extract constituents and water.

7. The process according to claim 2, wherein the formulation contains 40 weight percent fruit and 25 weight percent sugar.

8. The process of claim 7, wherein the hydrocolloid is adjusted to approximately 0.8 to 0.1 weight percent.

9. The process of claim 7, wherein no emulsifier is added.

10. The process of claim 2, wherein the formulation contains 30 weight percent fruit and 45 to 50 weight percent sugar.

11. The process of claim 10, wherein no emulsifier is added.

12. The process of claim 2, wherein the formulation contains 30 weight percent of fruit and 20 to 25 weight percent of sugar.

13. The process of claim 12, wherein no emulsifier is added.

14. The process of claim 2, wherein the formulation contains 30 weight percent of fruit and 10 to 20 weight percent of fructose.

15. The process of claim 1, wherein the formulation contains approximately 20 to about 30% fruit.

16. The process according to claim 1, wherein the formulation contains approximately 20 weight percent fruit and approximately 28 weight percent sugar.

17. The process according to claim 1, wherein the formulation contains approximately 20 weight percent fruit and approximately 18 weight percent fructose.

18. The process according to claim 16, wherein no emulsifier is added.

19. The process according to claim 1 wherein 0.03 to 0.08 weight percent of emulsifier is added.

20. The process for the preparation of an aerated food product comprising providing a supply of fruit-base, conveying said supply to aerating means, adjusting the speed of said aerating means and the gas volume and pressure introduced in said aerating means, aerating the fruit-base to thereby obtain the desired degree of aeration of 70 to 200% at a temperature of the ingredients at approximately 7° to 9° C., said fruit-base comprising:
(a) about 30% fruit, about 20 to 60% sugar to provide a sugar containing sweet aerated base, or
(b) about 30% fruit, 10 to 20% of a sugar substitute to provide a sugar-free sweet aerated base, or
(c) 30 to 50% fruit, salt and/or sugar to provide a spicy aerated food, or
(d) a fruit extract base, said fruit base having added thereto:
least one hydrocolloidal substance in the amount of 0.5 to 0.8% by weight, of the following composition:
25% of locust-bean flour,
25% of pectin, degree of esterification of about 35-38%,
30% of carrageenan,
the balance water.

21. The process according to claim 20, wherein an emulsifying agent selected from mono and diglycerides of edible fatty acids is added in a proportion of from 0.3 to 0.6% by weight, calculated on the basis of 20 to 70% dry mass.

22. The process according to claim 20, wherein about ion based on the weight of about 20 to 70% dry mass is obtained.

23. The process according to claim 20, wherein up to about 150% aeration based on the weight of about 20 to 70% dry mass is obtained.

24. An aerated food product formed by aerating a fruit-base of the following composition:
(a) about 30% fruit, about 20 to 60% sugar for sweet aerated base, or
(b) about 30% fruit, 10 to 20% of a sugar substitute for a sugar-free aerated base, or
(c) 30 to 50% fruit, salt and/or sugar in small amounts for spicy aerated foods, or
(d) a fruit extract base, said fruit base having added thereto:
at least one hydrocolloidal substance in an amount of 0.5 to 0.8% by weight, of the following composition:
25% of locust bean flour,
25% of pectin, degree of esterification of about 35-38%,
30% of carrageenan,
the balance water.

25. An aerated food product formed by aerating a of the following composition:
(a) about 40% fruit, about 25% sugar for sweet aerated base, or
(b) about 40% fruit, 25% of a sugar substitute for a sugar-free aerated base, or
(c) 40% fruit, salt and/or sugar in small amounts for spicy aerated foods, or
(d) a fruit extract base, said fruit base having added thereto:
at least one hydrocolloidal substance in amount of 0.5 to 0.8% by weight of the following composition:
25% of locust-bean flour,
25% of pectin, degree of esterification of about 35-38%,
30% of carrageenan,
the balance water.

26. The product according to claim 24, wherein the aeration is up to about 150% based on the weight of about 20 to dry mass.

27. The product according to claim 25, wherein the aeration is up to about 150% based on the weight of about 20 to dry mass.

28. The product according claim 25, wherein the content of hydrocolloidal substance is about 0.8 to 1.0% by weight.

29. The product according to claim 24, wherein the content of hydrocolloidal substances is about 0.8 to 1.0% by weight.

* * * * *